United States Patent
Ross

(10) Patent No.: US 9,487,231 B2
(45) Date of Patent: Nov. 8, 2016

(54) TIE ROD FORCE SENSING SYSTEMS AND METHODS

(71) Applicant: STEERING SOLUTIONS IP HOLDING CORPORATION, Saginaw, MI (US)

(72) Inventor: Christian E. Ross, Freeland, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 14/549,677

(22) Filed: Nov. 21, 2014

(65) Prior Publication Data

US 2015/0166101 A1 Jun. 18, 2015

Related U.S. Application Data

(60) Provisional application No. 61/909,087, filed on Nov. 26, 2013.

(51) Int. Cl.
*B62D 5/00* (2006.01)
*B62D 5/04* (2006.01)
*B62D 6/00* (2006.01)

(52) U.S. Cl.
CPC ............ *B62D 5/0472* (2013.01); *B62D 5/0463* (2013.01); *B62D 6/00* (2013.01); *B62D 6/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,736,810 A * | 4/1988 | Morishita | ............ | B62D 5/0487 180/404 |
| 5,828,972 A * | 10/1998 | Asanuma | ............... | B62D 5/006 180/446 |
| 6,079,513 A * | 6/2000 | Nishizaki | ............... | B62D 5/006 180/402 |
| 6,523,637 B1 * | 2/2003 | Nakano | .................. | B62D 5/003 180/402 |
| 6,848,536 B2 * | 2/2005 | Namgung | .............. | B62D 3/126 180/444 |

(Continued)

FOREIGN PATENT DOCUMENTS

| | | |
|---|---|---|
| DE | 19650475 C1 | 4/1998 |
| DE | 10017272 A1 | 10/2001 |

(Continued)

OTHER PUBLICATIONS

European Search Report for Application No. 14194796.0 dated May 20, 2015.

*Primary Examiner* — Jonathan L Sample
(74) *Attorney, Agent, or Firm* — Cantor Colburn LLP

(57) ABSTRACT

In accordance with an exemplary embodiment of the invention, a control system for controlling a steering system having a tie rod is provided. The control system includes a sensor coupled to the tie rod, the sensor configured to measure forces exerted on the tie rod and to generate a signal indicative of the measured forces, and a control module communicatively coupled to the sensor to receive the signal from the sensor. The control module is programmed to generate a motor assist command based on the generated signal to control the steering system.

14 Claims, 2 Drawing Sheets

(56) References Cited

U.S. PATENT DOCUMENTS

| | | | | |
|---|---|---|---|---|
| 7,146,287 B2* | 12/2006 | Kichise | | G01L 3/109 180/446 |
| 2002/0035424 A1* | 3/2002 | Kaufmann | | B62D 5/001 701/41 |
| 2003/0144780 A1* | 7/2003 | Recker | | B62D 5/065 701/41 |
| 2003/0197360 A1* | 10/2003 | Shimizu | | B62D 1/163 280/771 |
| 2004/0206571 A1* | 10/2004 | Nishizaki | | H02P 21/06 180/446 |
| 2005/0040781 A1* | 2/2005 | Nagase | | B62D 5/0484 318/432 |
| 2006/0201737 A1* | 9/2006 | Fleck | | B62D 5/008 180/446 |
| 2007/0221439 A1* | 9/2007 | Ha | | B62D 5/0424 180/444 |
| 2007/0250235 A1* | 10/2007 | Nakai | | B62D 5/003 701/43 |
| 2008/0066994 A1* | 3/2008 | Fujita | | B62D 5/0463 180/446 |
| 2010/0294586 A1* | 11/2010 | Nagase | | B62D 5/046 180/446 |
| 2011/0167940 A1* | 7/2011 | Shavrnoch | | B62D 5/0448 74/89.36 |
| 2011/0202212 A1* | 8/2011 | Gatten | | B60D 1/01 701/22 |
| 2012/0130592 A1* | 5/2012 | Lach | | B62D 5/0463 701/41 |
| 2012/0145473 A1* | 6/2012 | Suzuki | | B62D 5/046 180/446 |
| 2012/0232754 A1* | 9/2012 | Champagne | | B62D 5/0469 701/41 |
| 2013/0030653 A1* | 1/2013 | Soos | | B62D 5/0424 701/41 |
| 2013/0138296 A1* | 5/2013 | Kouchi | | B62D 6/00 701/41 |
| 2013/0138298 A1* | 5/2013 | Derry | | B62D 5/0481 701/42 |
| 2013/0197757 A1* | 8/2013 | Ellis | | B62D 5/0463 701/41 |
| 2013/0245890 A1* | 9/2013 | Kageyama | | B62D 7/18 701/41 |
| 2014/0084728 A1* | 3/2014 | Iwasaki | | H02K 3/00 310/156.01 |
| 2014/0084741 A1* | 3/2014 | Iwasaki | | H02K 29/03 310/216.091 |

FOREIGN PATENT DOCUMENTS

| | | |
|---|---|---|
| DE | 102007026189 A1 | 12/2008 |
| EP | 1415894 A2 | 5/2004 |
| JP | H03262959 A | 11/1991 |

* cited by examiner

TIE ROD FORCE SENSING SYSTEMS AND METHODS

CROSS REFERENCE TO RELATED APPLICATION

This Application claims the benefit of U.S. Provisional Application Ser. No. 61/909,087, filed Nov. 26, 2013, the contents of which are incorporated herein by reference thereto.

BACKGROUND OF THE INVENTION

The present invention relates generally to systems and methods for a steering apparatus and, more specifically, to systems and methods for sensing force in an electrically-powered steering apparatus to control the same.

Some known vehicles may include sensors to measure vehicle operator inputs into a vehicle steering system to assist in steering the vehicle. However, even with assisted steering, some known vehicles experience forces such as shakes, bumps, and rattles that can be felt by the driver through the vehicle steering system.

Accordingly, it is desirable to provide a sensor system to measure forces close to the source of such forces in order to compensate for the unwanted or unexpected sensations experienced during driving.

SUMMARY OF THE INVENTION

In accordance with an exemplary embodiment of the invention, a control system for controlling a steering system having a tie rod is provided. The control system includes a sensor coupled to the tie rod, the sensor configured to measure forces exerted on the tie rod and to generate a signal indicative of the measured forces, and a control module communicatively coupled to the sensor to receive the signal from the sensor. The control module is programmed to generate a motor assist command based on the generated signal to control the steering system.

In accordance with another exemplary embodiment of the invention, a steering system is provided. The steering system includes a steering shaft, a hand wheel coupled to the steering shaft, a steering gear assembly coupled to the steering shaft, the steering gear assembly including a rack coupled to a tie rod, and a sensor coupled to the tie rod. The sensor is configured to measure forces exerted on at least one of the rack and the tie rod.

In accordance with yet another exemplary embodiment of the invention, a method of controlling a steering system having a tie rod is provided. The method includes measuring, with a sensor coupled to the tie rod, a force exerted on the tie rod; receiving, with a control module, a signal indicative of the measured force; and generating, with the control module, a motor assist command based on the received signal to control the steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
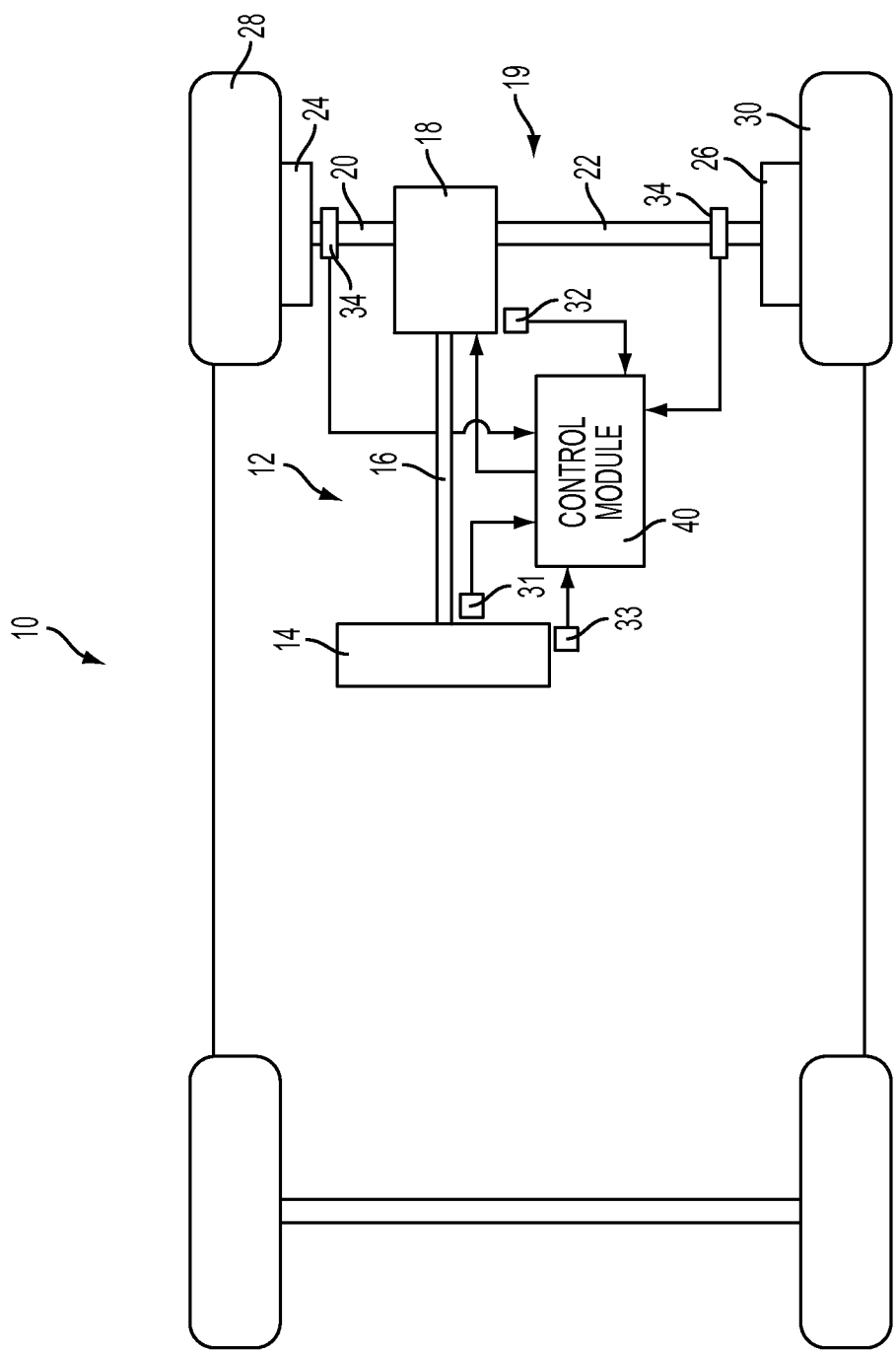
FIG. 1 is a block diagram illustrating a vehicle including a steering control system in accordance with an exemplary embodiment of the invention.

Referring now to the Figures, where the invention will be described with reference to various embodiments, without limiting same, a vehicle 10 is illustrated in FIG. 1 that includes a steering system 12. In various embodiments, steering system 12 includes a hand wheel 14 coupled to a steering shaft 16. In one embodiment, steering system 12 is an electric power steering (EPS) system that further includes a steering assist unit 18 that couples to steering shaft 16 of steering system 12 and to tie rods 20, 22 of vehicle 10. Steering assist unit 18 includes, for example, a rack and pinion steering mechanism 19 (FIG. 2) that may be coupled through steering shaft 16 to a steering actuator motor and gearing. During operation, as hand wheel 14 is turned by a vehicle operator, the motor of steering assist unit 18 provides the assistance to move tie rods 20, 22 which in turn move steering knuckles 24, 26, respectively. Steering knuckles 24, 26 are respectively coupled to roadway wheels 28, 30 of vehicle 10.

Although an EPS system is illustrated in FIG. 1 and described herein, it is appreciated that steering system 12 of the present disclosure can includes various controlled steering systems including, but not limited to, steering systems with hydraulic configurations, and steer by wire configurations.

As shown in FIG. 1, vehicle 10 includes various sensors 31, 32, 33, and 34 that detect and measure observable conditions of steering system 12 and/or of vehicle 10. Sensors 31, 32, 33, 34 generate sensor signals based on the observable conditions. In one example, sensor 31 is a torque sensor that senses the torque applied to hand wheel 14 by the operator of vehicle 10. Torque sensor 31 generates a hand wheel torque signal based thereon. In another example, sensor 32 is a motor speed sensor that senses a rotational speed and direction of the motor of steering assist unit 18. Sensor 32 generates a motor velocity signal based thereon. In yet another example, sensor 33 is a hand wheel position sensor that senses a position of hand wheel 14. Sensor 33 generates a hand wheel position signal based thereon. In yet another example, sensor 34 is a tie rod force sensor that senses forces applied to tie rods 20, 22 during operation of vehicle 10. Tie rod force sensor 34 generates a tie rod force signal based thereon.

A control module 40 controls the operation of steering system 12 based on one or more of the sensor signals and further based on the steering control and/or torque correction systems and methods of the present disclosure. Generally speaking, the steering control and/or torque correction systems and methods of the present disclosure generate a final assist command or motor assist command to the motor of steering assist unit 18. For example, the systems and methods receive a tie rod force signal from tie rod force sensor 34 and use this information to modify compensation algorithms. However, control module 40 may determine steering control value based on signals from any of sensors 31, 32, 33, 34, or a combination thereof.

As used herein, the term module refers to an application specific integrated circuit (ASIC), an electronic circuit, a processor (shared, dedicated, or group), and memory that executes one or more software or firmware programs, a combinational logic circuit, and/or other suitable components that provide the described functionality. The systems and methods can be implemented as a single control module 40 (as shown) or multiple control modules (not shown). Inputs to control module 40 can be generated from the sensors of vehicle 10, can be modeled within control module 40 (e.g., by sub-modules), can be received from other control modules, and/or can be predefined.

Figure 2:
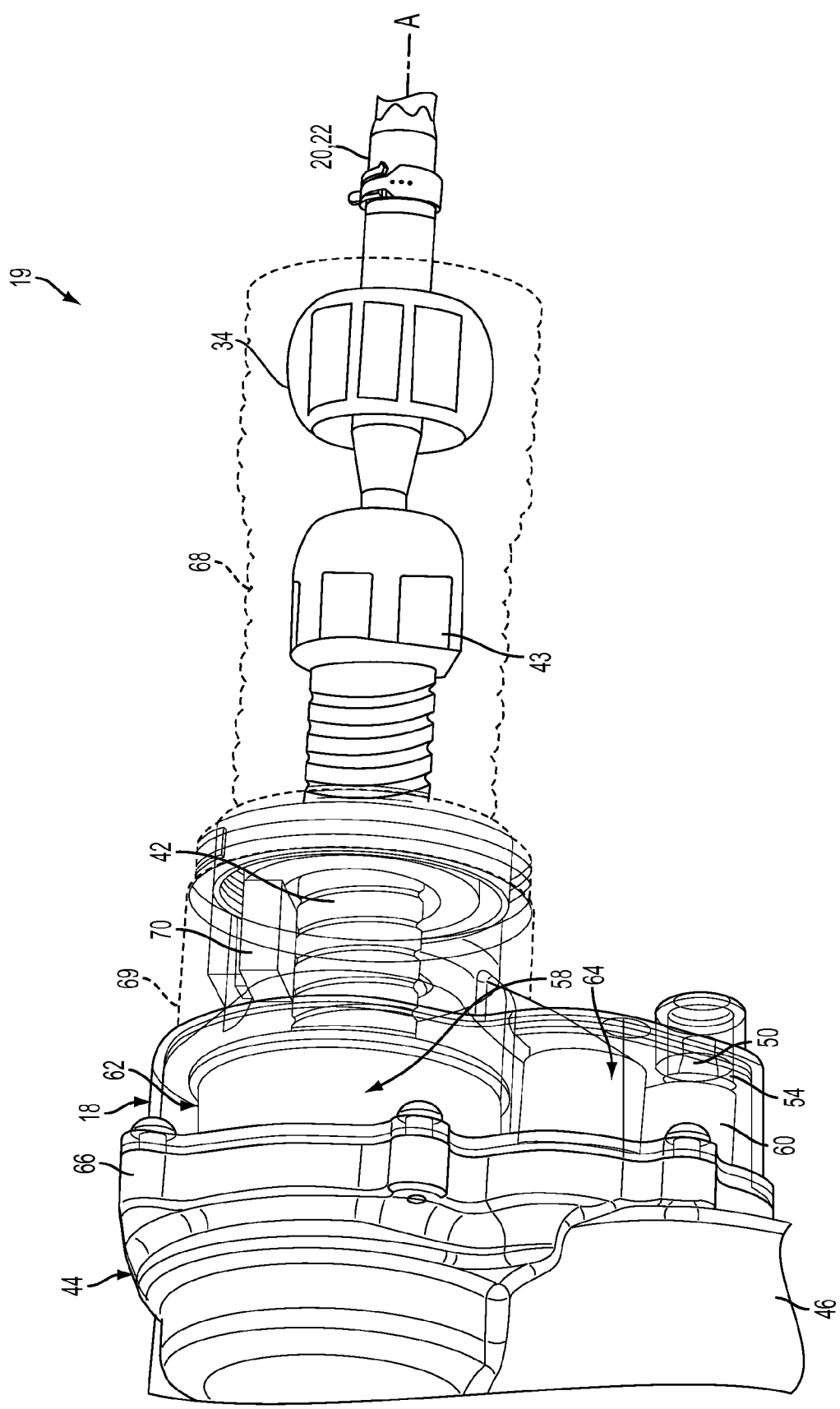
FIG. 2 is a perspective view of an exemplary steering gear assembly of the vehicle shown in FIG. 1.

As illustrated in FIG. 2, steering mechanism or steering gear assembly 19 includes an elongate rack 42 having a longitudinal axis A along which it linearly translates. The opposed axial ends of rack 42 are coupled to road wheels 28, 30 through respective tie rods 20, 22 each secured to rack 42 at one end via a joint 43, and to respective steering knuckles 24, 26 at the other end (FIG. 1). Rack 42 also includes an axially extending segment along which is provided a ball-screw portion 44 centered about axis A. Ball screw 44 is in mechanical communication with a reversible servomotor 46, and ball screw 44 and motor 46 may be located axially along rack 42. Actuation of servomotor 46 may be controlled by controller 40.

When the operator of the vehicle turns hand wheel 14, a rotational force is applied to steering shaft 16 and a pinion gear (not shown) is accordingly rotated. The movement of the pinion gear causes axial movement of rack 42 along axis A, which in turn manipulates tie rods 20, 22 and knuckles 24, 26 in order to reposition road wheels 28, 30 of the vehicle. Accordingly, when hand wheel 14 is turned the pinion gear and a matching tooth portion (not shown) convert rotary motion of hand wheel 14 into linear motion of rack 42. In order to assist the operator-applied force to steering system 12, motor 46 is energized and provides power assist to the movement of rack 42 through ball-screw 44, thereby aiding in the steering of vehicle 10 by the vehicle operator.

In the exemplary embodiment, a shaft 50 extends from motor 46 substantially in parallel with rack 42, and is rotated in one of two opposite angular directions when motor 46 is energized. Shaft 50 includes a driving pulley 54 rotatably fixed thereto, and is supported by a bearing (not shown). A flexible, endless drive belt 58, which has an outer surface 60 and an inner surface (not shown) is wrapped around driving pulley 54 such that the inner surface of belt 58 is in frictional contact with pulley 54. Belt 58 also wraps around a driven pulley 62 defining the outer circumference of an isolator assembly (not shown) such that the belt inner surface is in frictional contact with pulley 62. An additional pulley 64 may be included that is in frictional contact with belt outer surface 60, for example, to tighten belt 58. Motor 46, shaft 50, belt 58, the isolator assembly, and the rack and pinion gear set may all be contained in a steering gear assembly housing 66, which includes a boot 68, shown in phantom, to keep sensor 34 free of road dirt and debris.

In the embodiment shown, the steering gear assembly housing 66, and specifically boot 68, houses sensor 34. A solid shell portion 68 of housing 66 houses a charging and communication coil 70. As illustrated in FIG. 1, one sensor 34 is coupled to each of tie rods 20 and 22. Alternatively, one sensor 34 may be coupled to one of tie rods 20 and 22. Charging and communication coil 70 is located about rack 42. However, coil 70 may be located in any suitable location that enables vehicle 10 to function as describe herein. Sensor 34 is coupled to tie rods 20, 22 and, as such, measures forces on steering system 12 close to their source (i.e., closer to road wheels 28, 30) to facilitate compensating for unwanted or unexpected sensations felt during driving. For example, sensor 34 measures forces exerted on rack 42 and/or tie rods 20, 22 which cause movement in hand wheel 14. As sensor 34 measures such forces, signals from sensor 34 are sent to control module 40 to facilitate providing feedback for new compensation algorithms (e.g., road feel algorithms used to cancel or reduce feeling from the road surface). Sensor 34 may communicate with control module 40 via a wired, a wireless, or any other suitable communication method to report force vector data (i.e., magnitude and direction). As such, the sensor data is used in the algorithms or other processes to facilitate enabling steering assist unit 18 or other system to adjust steering system 12, for example, to give the vehicle driver a better feel of the road.

Additionally, in the exemplary embodiment, tie rod force sensor 34 facilitates diagnosing problems in the mechanical system between the pinion and wheels 28, 30 due to its location on tie rods 20, 22. For example, sensor 34 may detect a bent or broken tie rod based on measured forces and/or comparison thereof. Tie rod force sensor 34 may also provide redundancy for other sensors in the system. For example, if torque sensor 31 is damaged or becomes inoperable, the forces measured by sensor 34 may be used in place of drive torque measurements on the column as a system input to derive assist torque for the EPS.

In the exemplary embodiment, sensor 34 may be powered by controller 40 and/or coil 70. For example, sensor 34 may be powered by a direct electrical connection between sensor 34 and controller 40. Alternatively, or in addition, sensor 34 may be powered wirelessly from an electromagnetic field produced by a winding of coil 70 with current from controller 40. As such, sensor 34 may include a coil (not shown) to convert the electromagnetic field into current and voltage to power sensor 34. Sensor 34 may also transmit force data to controller 40 via coil 70.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A control system for controlling a steering system having a tie rod, the control system comprising:
a sensor coupled to the tie rod, the sensor configured to measure forces exerted on the tie rod and to generate a signal indicative of the measured forces; and
a control module communicatively coupled to the sensor to receive the signal from the sensor, the control module programmed to generate a motor assist command based on the generated signal to a steering assist unit that includes a motor having a shaft provided with a driving pulley connected to a driven pulley by a belt that wraps around the driving pulley and the driven pulley disposed within a steering gear housing that provides assistance to move the tie rod, wherein the control system further comprises a charging coil coupled to the steering system, wherein the charging coil is configured to generate an electromagnetic field that facilitates powering the sensor.

2. The control system of claim 1, wherein the charging coil is electrically coupled to the control module.

3. The control system of claim 1, wherein the sensor is electrically coupled to the control module.

4. The control system of claim 1, further comprising a second sensor coupled to a steering column of the steering system, the second sensor configured to sense a torque applied to a hand wheel of the steering system and to generate a second signal, wherein the control module is communicatively coupled to the second sensor to receive the second signal from the second sensor, the control module programmed to further generate the motor assist command based on the second signal.

5. A steering system comprising:
   a steering shaft;
   a hand wheel coupled to the steering shaft;
   a steering gear assembly coupled to the steering shaft, the steering gear assembly including a steering assist unit disposed within a steering gear assembly housing, the steering assist unit coupled to a rack coupled to a tie rod by a joint;
   a charging coil disposed within a solid shell portion extending from the steering gear assembly housing, the charging coil encircling the rack and disposed between the steering gear assembly housing and the joint; and
   a sensor coupled to the tie rod, the sensor disposed between an end of the tie rod and the joint, the sensor configured to measure forces exerted on at least one of the rack and the tie rod.

6. The steering system of claim 5, further comprising:
   a control module communicatively coupled to the sensor to receive a signal therefrom, the control module programmed to generate a motor assist command to the steering assist unit based on the signal from the sensor to provide assistance to move the tie rod.

7. The steering system of claim 5, wherein the charging coil is configured to generate an electromagnetic field that facilitates powering the sensor.

8. The steering system of claim 7, wherein the charging coil is electrically coupled to a control module communicatively coupled to the sensor, and the sensor is located within a flexible boot at least partially encasing the tie rod.

9. The steering system of claim 6, wherein the sensor is electrically coupled to the control module.

10. The steering system of 6, further comprising a second sensor coupled to the steering shaft, the second sensor configured to sense a torque applied to the hand wheel and to generate a second signal, the control module communicatively coupled to the second sensor to receive the second signal from the second sensor, the control module programmed to further generate the motor assist command based on the second signal.

11. A method of controlling a steering system having a tie rod, the method comprising:
   measuring, with a first sensor coupled to the tie rod, a force exerted on the tie rod;
   measuring, with a second sensor coupled to a steering column of the steering system, a torque applied to a hand wheel of the steering system;
   measuring, with a third sensor coupled to a motor of a steering assist unit, a rotational speed and direction of the motor;
   receiving, with a control module, a first signal from the first sensor indicative of the force exerted on the tie rod, a second signal from the second sensor indicative of the torque applied to the hand wheel, and a third signal from the third sensor indicative of a velocity of the motor;
   generating, with the control module, a motor assist command based on the received first signal, second signal, and third signal to control the steering system; and
   receiving, with the steering assist unit that couples a steering gear assembly to the tie rod, the motor assist command; generating an electromagnetic field with a charging coil coupled to the steering system; and powering the sensor with the generated electromagnetic field.

12. The method of claim 11, further comprising electrically coupling the charging coil to the control module.

13. The method of claim 11, further comprising powering the sensor with the control module.

14. The control system of claim 1, wherein the sensor is disposed between an end of the tie rod and a joint that couples the tie rod to a steering rack.

* * * * *